June 28, 1955  R. L. SCHAPKER  2,711,629
ROCKET ENGINE
Filed June 29, 1951  2 Sheets-Sheet 1
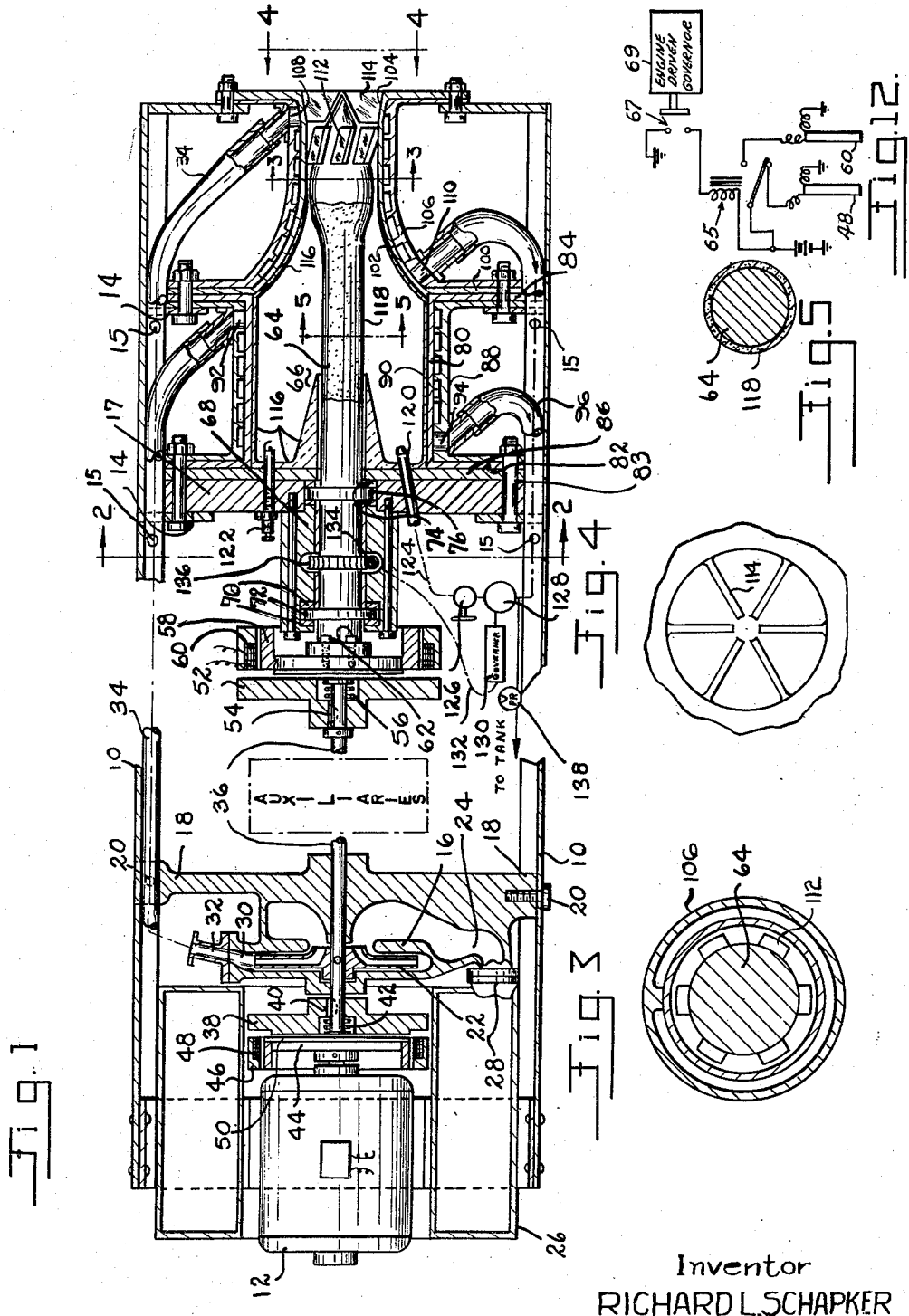
Inventor
RICHARD L. SCHAPKER
Toulmin & Toulmin
Attorneys June 28, 1955 R. L. SCHAPKER 2,711,629
ROCKET ENGINE
Filed June 29, 1951 2 Sheets-Sheet 2
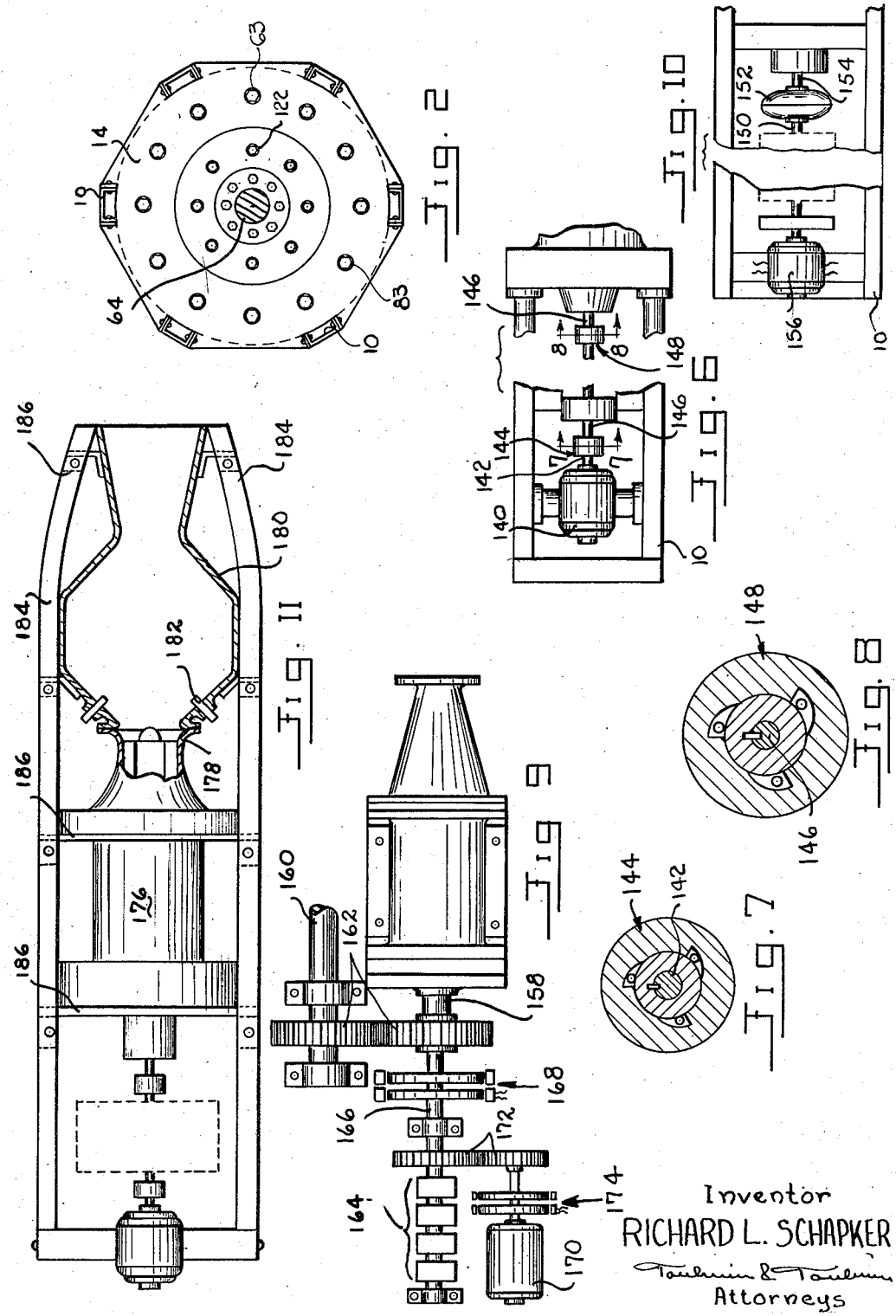
Inventor
RICHARD L. SCHAPKER
Attorneys

United States Patent Office 2,711,629
Patented June 28, 1955

2,711,629

ROCKET ENGINE

Richard L. Schapker, Cincinnati, Ohio

Application June 29, 1951, Serial No. 234,370

17 Claims. (Cl. 60—35.6)

This invention relates to internal combustion engines, and particularly to continuous combustion engines, such as jet or rocket engines.

Continuous combustion engines may be generally classified under two headings, the jet type, in which the front end of the engine is open for receiving air which forms one of the agents of combustion within the engine, and the rocket type, in which the front end of the engine is closed and the complete fuel charge for the engine is injected into the combustion chamber through nozzles or some similar agency.

For many purposes the rocket type engine is to be preferred over the jet type, and among which purposes are stationary installations, for exceedingly high altitude, and for high speed use. It is in connection with a rocket type engine that the present invention is particularly concerned.

Heretofore, it has been customary with a rocket type engine to provide auxiliary means, such as separate and disconnected gas generators, and the like for supplying power for operating the various auxiliaries required to operate the rocket engine. Such auxiliaries include fuel pumps, coolant pumps, lubricant pumps, generators, and governors. Because of these several auxiliaries ordinarily being separately powered, the ordinary type rocket engine is exceedingly complex and bulky, and sometimes the space required for the auxiliaries and the source of power for their operation occupies almost as much or more space as the engine proper.

According to this invention, an arrangement is provided whereby at least a portion of the energy generated by the combustion chamber of a rocket engine is diverted for operating the said auxiliaries.

In general, this is accomplished by positioning a turbine in the path of the gases leaving the combustion chamber, whereupon the turbine is driven in rotation and may be employed for operating the above-mentioned auxiliaries.

It is contemplated by this invention to arrange the turbine so that it absorbs only a predetermined amount of the generated energy, thereby leaving the remainder of the energy for developing a thrust on the engine. It is also contemplated to so arrange the turbine that the major portion of the generated energy is absorbed by the turbine, whereby the engine can be employed as a stationary engine or can be used to drive a propeller for an air craft or the like, or used as motive power in other instances where it is necessary to drive a shaft to make use of the said power.

According to this invention, one arrangement is proposed where there is a first stage comprising a rocket having a turbine driven by the gases from the combustion chamber thereof, and a second stage in the nature of a jet engine or a modified rocket engine into which the exhaust gases from the first stage are discharged, and wherein a secondary combustion occurs to create gases which are utilized solely for developing a thrust on the engine.

The exact nature of the present invention will be more clearly understood upon reference to the accompanying drawings, in which:

Figure 1 is a sectional view through a rocket engine constructed according to my invention;

Figures 2, 3, 4, and 5 are cross-sectional views indicated by lines 2—2, 3—3, 4—4, and 5—5, respectively, on Figure 1;

Figure 6 is a rather diagrammatic elevational view showing the arrangement with a rocket engine of a plurality of operating auxiliaries according to my invention;

Figures 7 and 8 are sectional views indicated by lines 7—7 and 8—8, respectively, on Figure 6 and showing overrunning clutches associated with the shaft for driving the auxiliaries of the engine and with the starting motor;

Figure 9 is a plan view showing an arrangement according to my invention wherein the greater part of the energy developed by the rocket engine is transmitted to a rotary driving shaft;

Figure 10 is a fragmentary plan view of a portion of an engine according to my invention showing the manner of connecting the starting motor with the shaft of the rocket engine through a fluid coupling;

Figure 11 is a more or less diagrammatic plan view showing an engine according to my invention including a second stage or afterburner; and Figure 12 is a diagrammatic representation of a governor controlled switch arrangement for connecting engine auxiliaries to the rocket engine turbine shaft.

Referring to the drawings somewhat more in detail, the engine illustrated in Figure 1 comprises an outer framework, represented by the rail members 10, which provide support at their one ends for an electric starting motor 12, and which are secured to the support plates 14 of the rocket engine. These rails are preferably channel-shaped members opening inwardly, as indicated in Figure 2, and the support plates 14 may advantageously comprise disk-like members having notches therein for receiving the rail members, as will also best be seen in Figure 2.

Bolts or rivets 15 secure plates 14 to the rail members, and in this manner the rail members provide the proper support for the various parts of the rocket engine and are capable of transmitting all of the developed power of the rocket engine to whatever mechanism the engine is arranged for actuating. The arrangement of the rail members as inwardly opening channels is advantageous in that there is provided space through which to run conduits, electric cables, and the like, in such a manner that they will be protected from damage at all times.

Between the rearmost one of plates 14 and the starting motor 12, there is a pump comprising a casing 16 having suitable means, such as the frame portion 18, for connection to the rails 10, as by the screws or bolts 20, and rotatably receiving the centrifugal impeller 22.

The casing 16 is also formed with an inlet channel 24 leading to a reservoir 26 through the connection indicated at 28. The casing 16 also comprises an outlet channel 30 that communicates through a fitting 32 with conduit means indicated at 34.

As will be seen in Figure 1, reservoir 26 may advantageously comprise an annular tank adapted for being received within the frame of the rocket engine and surrounding the starting motor 12. This provides for a compact assembly with the reservoir firmly supported at a plurality of points and in a protected location.

Impeller 22 is mounted on a shaft 36 which carries at its end adjacent starting motor 12 a movable clutch element 38 slidably keyed to the shaft, as by key 40, and continuously urged in one direction on the shaft by a spring 42.

On the output shaft of motor 12, there is another clutch member 44, which is normally spaced from clutch member 38, as indicated in Figure 1. The two clutch members and a stationary ring 46 form a magnetic circuit adapted for energization by a coil 48. When coil 48 is energized, clutch member 38 is drawn toward clutch member 44 against the influence of spring 42, and establishes a driving connection between the clutch members, as, for example, by means of the friction facing 50 on clutch member 44.

At its opposite end shaft 36 carries another movable clutch member 52 keyed to the said shaft by key 54 and adapted for being moved against a spring 56 into engagement with a clutch member 58 by energization of a coil 60 in the manner described in connection with clutch members 38 and 44.

Clutch member 58 is secured by cap screws 62 to a shaft 64 extending through the back plate 17 of the engine and into the combustion chamber 66 of the rocket engine.

Positioned on the back face of the back wall of the engine is a bearing block 68 which provides radial journaling for shaft 64, and which may also include thrust bearing means at 70 for engaging the opposite faces of a flange 72 on the shaft. Other thrust bearing means, as at 74, may be provided in the back plate of the engine, which cooperate with flange 76 on the said shaft.

Turning now to the rocket engine proper, this will be seen to comprise a cylindrical portion 80 surrounding combustion chamber 66 and having a flange 82 paralleling and adjacent to the front face of back plate 15. A second flange 84 is arranged at the front end of cylinder 80. Bolts 83 secure flange 82, back plate 17, and support plate 14 together, as illustrated in Figures 1 and 2.

Between flange 82 and back plate 17, there is preferably arranged the temperature resistant disk 86, which may be metal, but can also be formed of a heat resistant ceramic material. The provision of disk 86 serves to prevent plate 17 from being subjected to the intense heat of the combustion chamber.

Surrounding cylinder 80, there is provided a flanged cylindrical jacket element 88, having helical cooling passages 90 therein through which coolant is circulated around the combustion chamber. According to this invention, conduit 34 carrying the pumped fuel is connected with inlet 92 of the cooling jacket, whereas outlet 94 of the cooling jacket is connected with a conduit 96.

At the right end of cylinder 80, its flange 84 abuts a flange 100 of an inwardly tapering discharge nozzle member 102 of the engine. This nozzle member may advantageously be flanged at its other end, as illustrated at 104.

A cooling jacket 106, similar to the cooling jacket 88, surrounds the nozzle 102 and receives pumped fuel from conduit 34 at its inlet 108 and discharges the said fuel through its outlet 110 into a branch of conduit 96, this arrangement placing the two cooling jackets in parallel.

The previously referred to shaft 64 extends axially through the combustion chamber and into the nozzle, and in the said nozzle has blades 112 thereon inclined relative to the axis of the shaft, so that gases being discharged axially through the nozzle will exert a torque on the said shaft, thereby setting it in rotation and supplying power to the shaft to a degree depending on the velocity and the nature of the said gases and the size, number, and inclination of the blades 112. The shaft 64 and nozzle taper relatively, as indicated, and the effective areas of the nozzle and shaft are preferably so selected that no abrupt change occurs in the area of the throat through which the gases pass into the zone where the turbine shaft blades are located. This provision prevents loss of power because of turbulence of the gases in the discharge nozzle.

Rearwardly of the blades 112, the nozzle may include the blades 114, which are for the purpose of causing the exhaust from the rocket engine to issue therefrom in an axial direction, whereby the exhaust can be utilized for developing a thrust, should it be desired to use the engine in this manner.

In certain instances, it may be preferable to line at least a portion of the combustion chamber of the engine with a heat resisting ceramic material. Such a liner is shown at 116 in Figure 1, and may include a covering over the outer surface of the combustion chamber, over the back surface thereof, and a tapering sleeve-like part over that portion of shaft 64 nearest to the point at which combustion is initiated in the engine.

Further, shaft 64 may include a ceramic covering 118 which may be in the form of a sleeve mounted over the shaft, or may be provided by molding the ceramic material directly on the shaft. In this manner the metallic parts of the engine are at all times protected from the intense heat that can be generated in the combustion chamber under certain conditions and by using certain fuels.

Mounted in the back wall 17 of the rocket engine are a plurality of spaced nozzles 120, and intervening spaced spark plugs 122. The nozzles are, of course, for the purpose of supplying fuel to the combustion chamber, and the spark plugs are for the purpose of initiating combustion of the fuel.

The nozzles are adapted for being supplied with fuel under a predetermined pressure by a conduit 124, which is connected through the manually operated valve 126 and a governor controlled valve 128 with the conduit 96 into which the cooling jackets discharge. The purpose of the manually operated valve 126 is so that the supply of fuel to the combustion chamber can be shut off during the initial starting period of the engine to prevent an accumulation of fuel therein during the time that the fuel pump is being brought up to speed by the starting motor and developing the necessary pressure on the fuel system. The purpose of the governor controlled valve 128 is for regulating the supply of fuel to the nozzles to maintain the engine operating under predetermined conditions. The governor controlled valve is connected with a governor 130, which may be driven from shaft 64 by means of the connection 132 leading to the worm 134 that engages the worm gear 136 on shaft 64.

To provide for an adequate supply of coolant to the cooling jackets at all times, the fuel pump is arranged to deliver a volume of fluid in excess of that which is ever required to supply the nozzles 120. The excess of fluid passed through the cooling jackets to conduit 96 may advantageously be returned to the tank or reservoir 26 through the relief valve 138.

In Figure 1, there is indicated immediately to the right of the fuel pump on shaft 36 the auxiliaries that ordinarily are included with a rocket engine. These auxiliaries may consist of an oil pump, a separate fuel or coolant pump, a generator, etc. Heretofore, auxiliaries of this nature have been independently driven, but according to the present invention, shaft 36 is connected with shaft 64 when shaft 64 comes up to a predetermined speed after the engine has been started, and thereafter all power for operating the several auxiliaries of the engine are supplied by the engine itself through shaft 64. This results in a simple and effective arrangement, entirely eliminating any source of power other than that generated by the engine, except for whatever power is needed to energize the starting motor when the engine is first started. In certain instances, even this source of power can be included in the assembly of the engine in the form of a battery which is maintained charged by the operation of the abovementioned generator.

In starting the engine illustrated in Figure 1, clutch elements 38 and 44 are engaged by energization of coil 48, whereas clutch members 52 and 58 are separated from each other because coil 60 is de-energized. With valve 126 closed, the starting motor can then be energized until the fuel pump comes up to speed and develops the proper pressure on the fuel supply to the nozzles. When this pressure reaches the proper amount, valve 126 is opened to commence the supply of fuel through the nozzles and into the combustion chamber and the spark plugs will then initiate combustion.

Shaft 64 will commence to be driven substantially immediately, and when it reaches a predetermined speed, coil 48 can be de-energized and coil 60 energized, thereby to disconnect clutch members 38 and 44 and to connect clutch members 52 and 58. The driving of all of the auxiliaries including the fuel pump is now done by shaft 64 and the starting motor can be de-energized. This de-energizing of the one clutch coil and energizing of the other can conveniently be carried out by a governor controlled switching mechanism, if desired, so that the auxiliary of shaft 36 and the power shaft 64 will be substantially exactly synchronized at the moment the power shaft takes over the driving of the auxiliary shaft.

For example, as shown in Figure 12, a relay 65 has a blade normally closed on a contact connected with coil 48 but, when the relay is energized by closing of switch 67 that is controlled by the engine driven governor 69 indicating that shaft 64 has reached the speed of shaft 36, the relay blade leaves the coil 48 contact and moves to the coil contact thus disconnecting shaft 36 from motor 12 and connecting it instead to shaft 64.

During continued operation of the engine, the governor 130 controls the supply of fuel to the nozzles to maintain the desired operating conditions of the engine, and it will be understood that this governor control mechanism would be adjustable to vary the supply of fuel to the engine when necessary or desirable.

The arrangement described above utilizes electrically controlled clutches for connecting the auxiliary shaft first with the driving motor and then with the power shaft of the engine.

In Figure 6 a somewhat modified arrangement is shown, wherein the starting motor 140 is adapted for connection with auxiliary shaft 142 through an overrunning clutch 144. Similarly, the power shaft 146 of the engine is connected with shaft 142 through overrunning clutch 148.

Referring now to Figure 7, it will be seen that when starting motor 140 is energized, it will drive through its clutch 144 to shaft 142, thereby driving the auxiliaries of the engine, whereas overrunning clutch 148 will permit free rotation of shaft 142 relative to shaft 146.

However, once the speed of shaft 146 equals the speed of shaft 142, clutch 148 will engage and clutch 144 will commence to overrun. Thus, by the Figure 6 arrangement, the electrical clutches can be eliminated and the picking up of auxiliary shaft 142 by power shaft 146 accomplished at the precise instant that the speeds of the two shafts are synchronized.

Figure 10 illustrates a still further modified arrangement wherein the auxiliary shaft 150 is connected through a fluid coupling 152 with the power shaft 154. In Figure 10, the starting motor 156 is a combination motor and generator, and when the engine is first started the starting motor is effective, and, thereafter, when the engine comes up to speed, the generator portion is effective.

In the Figure 10 arrangement, the fluid coupling 152 will slip when the starting motor is energized, thereby permitting the auxiliary shaft 150 to come up to speed. Thereafter, when the power shaft comes up to the proper speed, it will deliver power through the fluid coupling to the auxiliary shaft and maintain the auxiliary shaft operating at the proper speed.

It will be apparent that the fluid coupling 152 could be designed so as to be efficient in the transfer of power from shaft 154 to shaft 150, while being inefficient for transmitting power from shaft 150 to shaft 154. By the Figure 10 arrangement, all clutch arrangements between the starting motor and the power shaft of the engine can be eliminated merely by introducing the fluid coupling 152 at the proper point.

In Figure 9, I illustrate an arrangement whereby substantially the entire power generated by the engine is delivered to its power shaft 158. This transfer of energy into the power shaft is accomplished, as mentioned in connection with Figure 1, by a suitable arrangement of the vanes on the power shaft, so that there is a minimum amount of energy remaining in the gases exhausted from the discharge nozzle of the engine. There may also be vanes in the combustion chamber ahead of the vaned part of the shaft to give the gases a rotational component before they impinge on the shaft vanes, if desired.

In Figure 9, the shaft 158 of the engine is connected with a shaft 160 that is to be driven by the gearing 162. The auxiliaries for the engine are indicated at 164 on a shaft 166. A clutching arrangement at 168 is provided to connect and disconnect shafts 166 and 158 in the manner previously described.

Figure 9 also includes a starting motor 170 adapted for connection with auxiliary shaft 166 through gearing 172 and clutch mechanism 174. It will be apparent that substantially the same cycle of operations described in connection with Figure 1 will obtain for the Figure 9 arrangement, except that substantially all of the energy developed by the rocket engine will be delivered to shaft 160.

In Figure 11 I illustrate an engine construction wherein the rocket engine is mounted in tandem with a secondary engine, or afterburner. In Figure 11 the rocket engine is indicated at 176, and its discharge nozzle 178 is arranged to discharge into the inlet of an afterburner 180, which is arranged in the form of a jet engine. Afterburner 180 is adapted for being supplied with a fuel through nozzles 182 arranged to supply fuel to the exhaust gases of the rocket engine.

In Figure 11 the frame members 184 may be positioned similarly as those in Figure 1, and extend the full length of the engine to be connected with both stages of the engine, as by the plates 186 which may be similar in connection to the plates 14, described in connection with Figure 1.

The Figure 11 frame arrangment is of benefit in that all thrusts exerted by the engines are transmitted directly to the framework and can thus be absorbed in a proper and efficient manner. The same advantage also obtains that the channels of the framework form convenient spaces in which to run conduits and electric cables and the like, so that the entire engine can readily be enclosed in a fairing housing.

In the Figure 11 arrangement a novel interrelationship between the rocket engine stage of the device and the jet engine stage of the device can be obtained by supplying to the rocket engine a fuel which has as one of its products of combustion a substance which will serve as a fuel in the jet engine stage, thereby leading to greater efficiency of burning of the fuel and reducing the problem of supplying fuel to the jet engine stage.

Among fuels that can be employed with this result is hydrogen peroxide, which, when used as a fuel in the rocket engine stage, produces free oxygen as one of its products of combustion. This oxygen, when discharged into the inlet of the jet engine stage at relatively high velocity and at a pressure of about three hundred pounds per square inch, will serve as an agent for combining with a fuel injected through nozzles 182, such lastmentioned fuels possibly comprising gasoline, or alcohol.

The Figure 11 engine arrangement therefore provides a direct cooperation between the rocket and jet stages, so that rotary power can be taken from the power shaft of the rocket stage, and both the rocket and jet stages of the engine will contribute thrust.

It will be understood that this invention is susceptible to modification in order to adapt it to different usages

I claim:

1. In combination; a rocket engine comprising a frame defining a generally cylindrical combustion chamber having means at one end of the chamber for the injection of fuel therein and having a tapering discharge nozzle at the other end of the chamber, a shaft rotatably supported in the frame of the engine and extending axially through said combustion chamber and into said nozzle, the end of the shaft in the nozzle tapering outwardly toward the back and then tapering inwardly to a point to provide for a nozzle that varies uniformly in cross-section, skewed vanes on said shaft in said nozzle, whereby the gases passing through the nozzle drive the shaft in rotation, and axial vanes in the nozzle rearwardly of the vanes on said shaft for straightening out the gas flow from the nozzle of the engine.

2. In combination: a rocket engine comprising a substantially cylindrical combustion chamber, a back plate closing one side of the combustion chamber and a tapering discharge nozzle connected to the other side of said chamber, a shaft extending through said back plate and through said combustion chamber centrally thereof and having its end disposed in said nozzle, journal means journaling said shaft in said back plate and skewed vanes mounted on the part of the shaft in said nozzle, the end of the shaft in the nozzle tapering outwardly toward the back and then tapering inwardly to a point, and said vanes being mounted on the inwardly tapered portion thereof, and said nozzle having axial vanes therein rearwardly of the vanes on said shaft in the path of the gases exiting from the nozzle whereby to straighten out the flow of the said gases.

3. In combination: a rocket engine comprising a cylindrical member open at both ends and defining a combustion chamber, a back plate mounted on one end of said member and closing the one end of said combustion chamber, a tapering discharge nozzle mounted on the other end of said member, bearing means mounted on the outside of said back plate, a shaft extending through said bearing means, back plate, and combustion chamber into said nozzle, journal means supporting said shaft against radial and axial movement in said bearing block back plate, vanes on the end of the shaft within said nozzle projecting radially from the shaft and skewed relative to the axis thereof, and axial vanes in the nozzle rearwardly of and radially overlapping the vanes on the shaft for straightening out the gas flow from the nozzle to eliminate turbulence therein and provide for greater efficiency of operation of the engine.

4. In combination: a rocket engine comprising a stationary cylindrical member open at both ends and defining a combustion chamber, a back plate mounted on one end of said member and closing the one end of said combustion chamber, a tapering discharge nozzle mounted on the other end of said member, bearing means mounted on the outside of said back plate, a shaft extending through said bearing means, back plate, and combustion chamber into said nozzle, journal means supporting said shaft against radial and axial movement in said bearing block back plate, and vanes on the end of the shaft within said nozzle projecting radially from the shaft and skewed relative to the axis thereof, said vanes being disposed inwardly from the end of said nozzle and said nozzle comprising radial vanes adjacent the end thereof extending in an axial direction for straightening the gas flow from the nozzle to eliminate turbulence therein and provide for greater efficiency of operation of the engine.

5. In combination: a rocket engine comprising a combustion chamber having a tapering discharge nozzle, a shaft extending axially through said combustion chamber centrally thereof having its end disposed within said nozzle, vanes on said shaft whereby the gases passing through said nozzle will drive said shaft in rotation, a ceramic liner within said combustion chamber and extending at least part-way along said nozzle, and a ceramic member extending from the side of said combustion chamber opposite said nozzle part-way along said shaft and surrounding said shaft, said ceramic member tapering inwardly from its base toward the said nozzle to define a tapering chamber in which combustion is initiated in the combustion chamber.

6. In combination: a rocket engine comprising a combustion chamber having a tapering discharge nozzle, a shaft extending axially through said combustion chamber centrally thereof having its end disposed within said nozzle, vanes on said shaft whereby the gases passing through said nozzle will drive said shaft in rotation, a ceramic liner within said combustion chamber and extending at least part-way along said nozzle, and a ceramic member extending from the side of said combustion chamber opposite said nozzle part-way along said shaft and surrounding said shaft, said ceramic member tapering inwardly from its base toward the said nozzle, said shaft likewise comprising a protective ceramic coating over at least a portion of its length including a portion of the shaft inside said ceramic member.

7. In combination: a rocket engine having a closed combustion chamber with a tapering discharge nozzle, a shaft extending through said combustion chamber and having one end disposed within said nozzle, skewed vanes mounted on the said one end of the shaft, a fuel pump for supplying fuel to said engine, an electric drive motor, and clutch means between said motor and pump and also between said pump and shaft selectively operable for connecting said pump for being driven by said electric motor or by said shaft.

8. In combination: a rocket engine having a closed combustion chamber with a tapering discharge nozzle, a shaft extending through said combustion chamber and having one end disposed within said nozzle, skewed vanes mounted on the said one end of the shaft, operating auxiliaries including a fuel pump for said engine, an electric motor, and clutch means between said auxiliaries and motor and between said auxiliaries and shaft selectively operable for connecting said auxiliaries with said motor or with said shaft.

9. In combination: a rocket engine having a closed combustion chamber with a tapering discharge nozzle, a shaft extending through said combustion chamber and having one end disposed within said nozzle, skewed vanes mounted on the said one end of the shaft, operating auxiliaries for said engine including a fuel pump arranged coaxially with said shaft, a drive motor also arranged coaxially with said shaft, an electric motor, and clutch means between the motor and auxiliaries and also between the auxiliaries and shaft selectively operable for causing driving of the auxiliaries by said electric motor or by said shaft.

10. In combination: a rocket engine, operating auxiliaries therefor arranged coaxially with the engine, an electric starting motor for driving said auxiliaries to start the engine, a turbine shaft extending into said engine for being driven by the exhaust gases thereof and arranged to drive the auxiliaries after the engine has started, and a plurality of circumferentially spaced axially extending frame members surrounding said engine, auxiliaries, and motor, and connected therewith for supporting the entire assembly in assembled relation, said frame members comprising inwardly opening channels, and the connection between said members and the rocket engine comprising annular mounting rings secured to said engine and having notched peripheries for receiving the said members.

11. An arrangement according to claim 10 which includes an afterburner connected to the discharge nozzle of the rocket engine to receive the exhaust gases therefrom, said afterburner having a discharge nozzle opening to the atmosphere, said circumferentially spaced frame members extending beyond said engine and along said afterburner and being rigidly connected with said afterburner for absorbing all of the external forces developed by said engine and afterburner.

12. In combination: a rocket engine having a discharge nozzle, a jet engine having its inlet connected with said nozzle and having a discharge nozzle opening to the atmosphere, a turbine shaft extending into said rocket engine to be driven thereby, operating auxiliaries for said engines arranged coaxially with said turbine shaft, and a frame comprising circumferentially spaced axially extending members surrounding said engines and auxiliaries and connected therewith.

13. In combination: a rocket engine having a discharge nozzle, a jet engine having its inlet connected with said nozzle and having a discharge nozzle opening to the atmosphere, a turbine shaft extending into said rocket engine to be driven thereby, operating auxiliaries for said engines arranged coaxially with said turbine shaft, a frame comprising circumferentially spaced axially extending members surrounding said engines and auxiliaries and connected therewith, an electric motor also mounted in said frame and adapted for selectively driving said auxiliaries during the starting period of said engines.

14. In a rocket engine, a turbine shaft extending into the discharge nozzle of the engine for being driven by the exhaust gases thereof, operating auxiliaries for said engine arranged coaxially with said turbine shaft and comprising a drive shaft, an electric drive motor having an output shaft coaxial with said drive shaft, and means for connecting said drive shaft with said output shaft during the starting period of said engine and with said turbine shaft during the running period of said engine, said means comprising overrunning clutches connecting said output shaft with said drive shaft and said drive shaft with said turbine shaft, whereby said auxiliaries can first be driven by said starting motor, and thereafter, when said turbine shaft reaches a predetermined speed, the auxiliaries will be driven by said turbine shaft.

15. In combination; a rocket engine having a discharge nozzle, a jet engine having its inlet connected with said nozzle and having a discharge nozzle opening to the atmosphere, a turbine shaft extending into said rocket engine to be driven thereby, operating auxiliaries for said engines arranged for being driven by said turbine shaft, and a frame comprising circumferentially spaced axially extending members surrounding said engines and auxiliaries and supportingly connected therewith.

16. In combination; a rocket engine having a discharge nozzle, a jet engine having its inlet connected with said nozzle and having a discharge nozzle opening to the atmosphere, a turbine shaft extending into said rocket engine to be driven thereby, operating auxiliaries for said engines arranged for being driven by said turbine shaft, a frame comprising circumferentially spaced axially extending members surrounding said engines and auxiliaries and connected therewith, and a starting means also mounted in said frame and adapted for selectively driving said auxiliaries during the starting period of said engines.

17. In a rocket engine, a turbine shaft extending into the discharge nozzle of the engine for being driven by the exhaust gases thereof, operating auxiliaries for said engine arranged coaxially wtih said turbine shaft and comprising a drive shaft, a starting motor having an output shaft coaxial with said drive shaft, and means for connecting said drive shaft with said output shaft during the starting period of said engine and with said turbine shaft during the running period of said engine, said means comprising overrunning clutches connecting said output shaft with said drive shaft and said drive shaft with said turbine shaft, whereby said auxiliaries can first be driven by said starting motor and, thereafter, when said turbine shaft reaches a predetermined speed, the auxiliaries will be driven by said turbine shaft.

References Cited in the file of this patent

UNITED STATES PATENTS

| | | |
|---|---|---|
| 2,256,198 | Hahn | Sept. 16, 1941 |
| 2,283,863 | Achterman | May 19, 1942 |
| 2,496,710 | Goddard | Feb. 7, 1950 |
| 2,500,537 | Goddard | Mar. 14, 1950 |
| 2,517,822 | Anderson | Aug. 8, 1950 |
| 2,523,009 | Goddard | Sept. 19, 1950 |
| 2,523,656 | Goddard | Sept. 26, 1950 |
| 2,536,598 | Goddard | Jan. 2, 1951 |
| 2,576,985 | Wildhack | Dec. 4, 1951 |
| 2,623,352 | Sedille et al. | Dec. 30, 1952 |